United States Patent
Barnes et al.

(10) Patent No.: US 6,689,446 B2
(45) Date of Patent: Feb. 10, 2004

(54) VEHICLE PANEL

(75) Inventors: Timothy Ronald Barnes, Essex (GB); Michael Ian Birrell, Hertfordshire (GB)

(73) Assignees: Yazaki Corporation, Tokyo (JP); BI Composites Limited, Staffordshire (GB)

(*) Notice: Subject to any disclaimer, the term of this patent is extended or adjusted under 35 U.S.C. 154(b) by 0 days.

(21) Appl. No.: 10/049,516

(22) PCT Filed: Jun. 18, 2001

(86) PCT No.: PCT/GB01/02670
§ 371 (c)(1),
(2), (4) Date: May 1, 2002

(87) PCT Pub. No.: WO01/98112
PCT Pub. Date: Dec. 27, 2001

(65) Prior Publication Data
US 2002/0149233 A1 Oct. 17, 2002

(30) Foreign Application Priority Data
Jun. 2, 2000 (GB) .............................................. 0015098

(51) Int. Cl.[7] .............................. B32B 1/04; B60J 5/00; H01B 13/00; B29C 63/00
(52) U.S. Cl. ...................... 428/68; 428/137; 296/146.7; 296/208; 264/272.11; 264/272.14; 264/272.15; 156/51; 156/292

(58) Field of Search ................................ 428/131, 137, 428/172, 188, 68, 357, 375; 264/1.25, 272.11, 272.14, 272.15; 156/60, 51, 292; 29/863, 873; 296/97.23, 208, 146.7

(56) References Cited

U.S. PATENT DOCUMENTS

| | | | |
|---|---|---|---|
| 3,391,432 A | 7/1968 | DuRocher | |
| 4,375,379 A | 3/1983 | Luetzow | |
| 5,309,634 A | 5/1994 | Van Order et al. | |
| 5,705,104 A | 1/1998 | Trublowski et al. | |
| 6,537,641 B1 * | 3/2003 | Kroll | 428/95 |

FOREIGN PATENT DOCUMENTS

| | | |
|---|---|---|
| DE | 196 49 972 A1 | 5/1998 |
| GB | 2 275 373 A | 8/1994 |

* cited by examiner

*Primary Examiner*—Donald J. Loney
(74) *Attorney, Agent, or Firm*—Sughrue Mion, PLLC

(57) ABSTRACT

A method of producing a vehicle panel. The method comprises the steps of: laying wire on a first sheet of thermoplastic or thermoset composite material in a desired configuration; placing or forming a second sheet of thermoplastic or thermoset material on the first sheet of material thereby sandwiching the wire; and, pressing the sheets together so that they encase and insulate the wire, wherein the wire is left exposed at connection points formed by apertures in the sheets. A vehicle panel made according to the method is also disclosed.

12 Claims, 7 Drawing Sheets

VEHICLE PANEL

This invention relates to a vehicle panel, such as a trim panel and to the electrical interconnection of vehicle components.

In conventional vehicle construction wires which are used to connect and supply power to the components which make up the electrical system of the vehicle are secured to vehicle trim panels by-various types of clips and straps. These wires have to be secured to vehicle trim panels and connected to electrical components manually on an assembly line. This installation process is time consuming, labour intensive and frequently gives rise to errors. Furthermore design changes with such a configuration can cause considerable difficulties. A form board (generally referred to as tooling) is used to lay out the wire in a specific design for one area of the vehicle. If there is a design change then the form board needs to be modified, delaying production and also increasing manufacturing cost.

According to the present invention there is provided a method of producing a vehicle panel comprising the steps of:
- laying wire on a first sheet of thermoplastic or thermoset composite material in a desired configuration;
- placing or forming a second sheet of thermoplastic or thermoset material on the first sheet of material thereby sandwiching the wire; and
- pressing the sheets together so that they encase and insulate the wire, wherein the wire is left exposed at connection points formed by apertures in the sheets;
- wherein the wire is secured by wire holders at positions corresponding to the connection points prior to pressing or forming the second sheet of thermoplastic material, and a method according to any of the preceding claims, wherein the wire holders are arranged to be flush or recessed with respect to one surface of the panel when it is formed.

The method of the present invention removes the need for manual clipping of the wires into position, thus reducing the labour cost of assembling the panel. Furthermore according to the present invention the panel can be a modular structure. This reduces the complexity of the process of installing the panel in a vehicle, further reducing labour costs. The reduction in manual labour both in assembly and installation of panels also reduces the frequency of errors occurring and reduces the amount of damage sustained by the panels during assembly and installation.

Preferably a method of producing a vehicle panel further comprises the step of heating the sheets prior to forming them together.

Preferably the first or second thermoplastic or thermoset sheet is a composite laminate.

Preferably the wire is laid manually, although the wire of the present invention can be laid automatically by a wire laying machine. This reduces labour costs and time in the assembly process, as well as reducing errors. Moreover with automatic wire laying, design changes can easily, quickly and relatively cheaply be incorporated, as it requires only a change in software and not a change in tooling which is required each time a wiring design is changed in prior art trim panel assemblies.

According to another aspect of the present invention there is provided a vehicle panel comprising:
- at least one electrically conductive wire;
- a thermoplastic or thermoset sheet encasing and insulating the conductive wire; and,
- apertures in the sheet containing holders to retain the wire and to allow the wire to be connected to external electrical components, wherein the wire holders are substantially flush or recessed with the surface of the panel.

The panel of the present invention does not require the clips, straps, tubes or tape of conventional panels for securing wires, thereby reducing the cost of the trim panel assembly. Furthermore the space and weight of the panel and wiring system of the present invention is less than in conventional panels. Also the panel of the present invention provides insulation for the wire, therefore the wire does not have to be insulated prior to assembly of the panel. Using non-insulated wires reduces the processing of the wire and reduces the cost of the raw materials needed for a panel.

The panel may be a trim panel. The sheet may be a composite laminate. The vehicle may comprise plural electrically conductive wires, insulated from one another by the sheet. The sheet may be made from continuos unidirectional glass reinforced polypropylene (CUGRP), random glass reinforced or natural fibre reinforced or may be glass reinforced polyurethane (S-RIM).

The wire holders are preferably adapted to be compatible with insulation displacement connectors (IDCs).

An insulation displacement connector works by an insulated wire being forced into a 'V' shaped slot. The width of the "V" is less than that of the diameter of the wire—thus the V shape cuts into the insulation of the wire and into the wire itself.

The terminal, being made of conductive material, forms a contact once the insulation has been displaced and it is touching the wire.

Examples of the present invention will now be described with reference to the accompanying drawings, in which.

Figure 1:
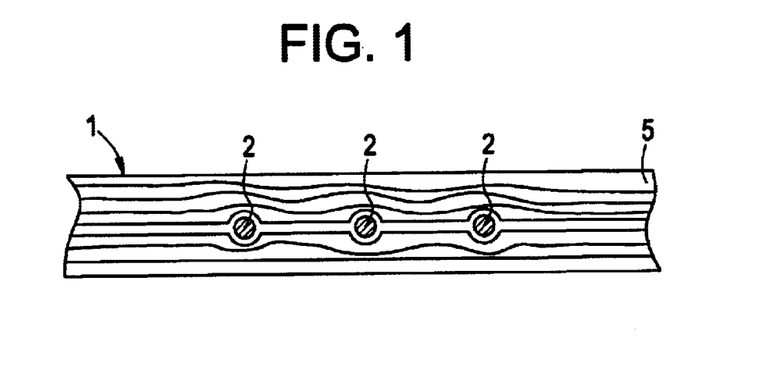
FIG. 1 is a cross sectional view of a panel according to a preferred embodiment of the present invention.

FIG. 1 shows a cross section of vehicle trim panel 1 according to an embodiment of the present invention. Wires 2 are surrounded and encased by layers of Continuous Unidirectional Glass Reinforced Polypropylene (CUGRP) 5, a thermoplastic material which electrically insulates the wires from each other and the environment. The wires are non-insulated and are either single core or compressed multi-core wires.

CUGRP is available in two main forms, a co-mingled polypropylene/glass fibre woven material, or as a melt impregnated prepreg on reels. The prepreg sheets are approximately 0.2 mm thick and can be laid on top of one another until the desired thickness is achieved. In the panel shown in FIG. 1 there are eight layers of CUGRP forming a laminate structure, with four layers on either side of the wires 2. Each layer of CUGRP is 0.25 mm thick, making the finished panel 2 mm thick, which is suitable for a vehicle door trim panel. The properties of CUGRP make it suitable for use as a structural material, allowing a large number of applications. Apart from use in conventional trim panels, headliners, instrument panels and door trim panels, other possibilities exist such as vehicle floor pans, roof and modular trim panels onto which components are assembled.

Figure 2:
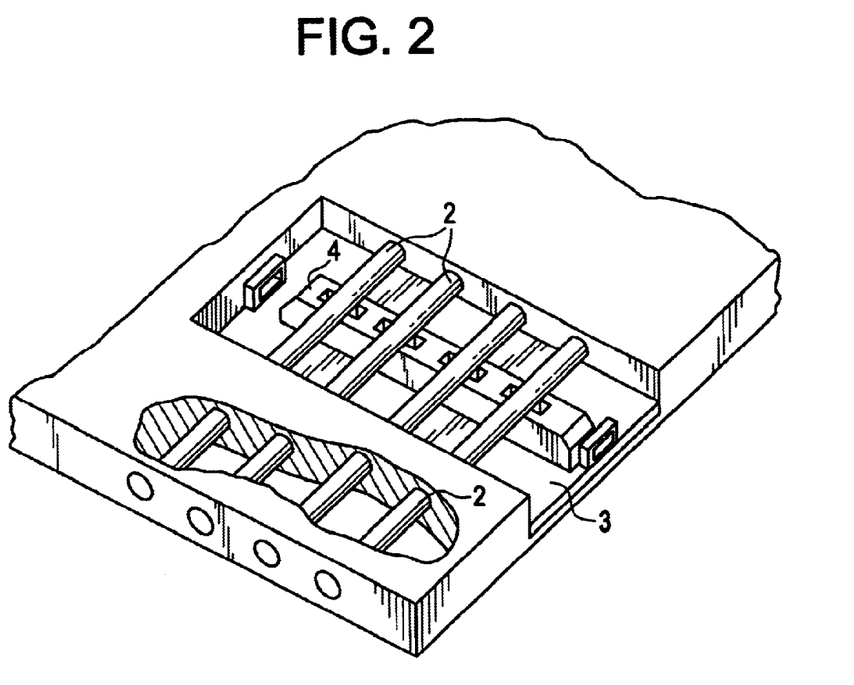
FIG. 2 shows a wire holder used to hold the wire at connection points.

FIG. 2 shows detail of a wire holder 4 according to one embodiment of the present invention. The wire holder is made from a resilient, non-conductive material. The wire holder is positioned in an aperture 3 in the CUGRP sheets 5 such that it is flush with the upper surface of it. The aperture is formed through all of the sheets positioned on one side of the wires. The wire holder 4 displaces the wires 2 from the surface of the sheet, retaining the wires in troughs 7 formed in the holder. Those portions of the wires held in the wire holder can form connection points, as can be more clearly seen from FIG. 3.

Figure 3:
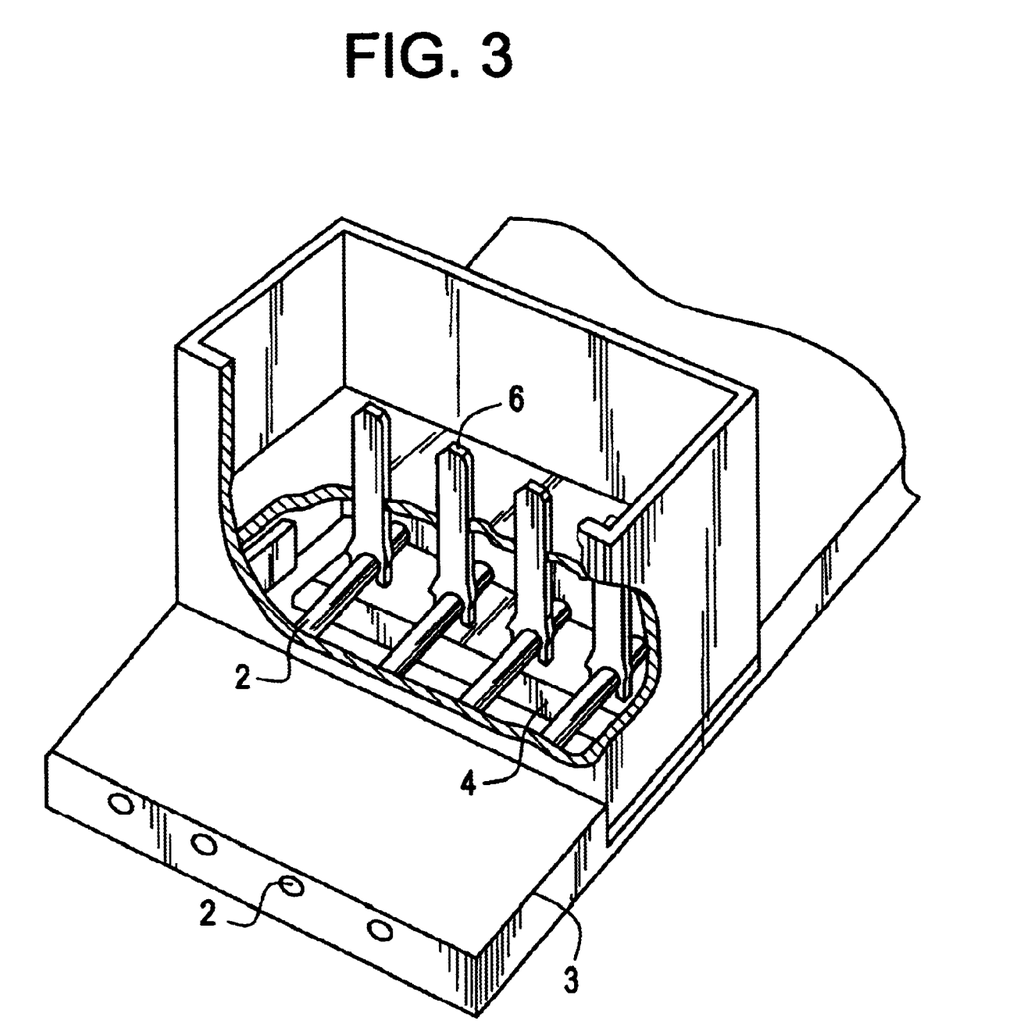
FIG. 3 shows a wire in a holder with an Insulation Displacement Connector inserted.
Figure 5:
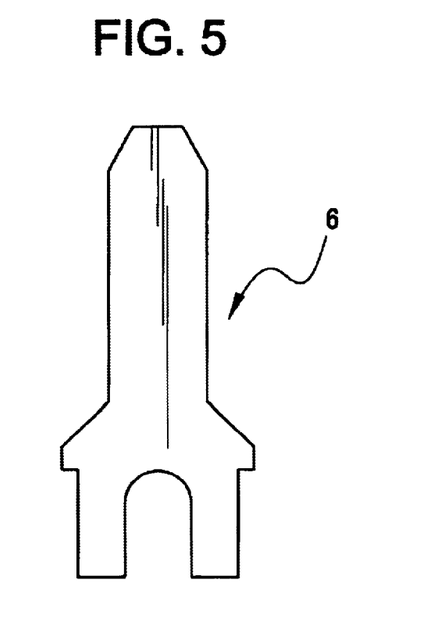
FIG. 5 shows a cross section of an IDC connector.

FIG. 3 shows a wire 2 in a holder 4 with an Insulation Displacement Connector (IDC) 6 inserted into the trough formed in the wire holder 4. As shown in FIG. 5 the IDC 6 is shaped like a two tined fork. The IDC slots into the wire holder tine, with a tine positioned on each side of the wire, and forms an electrical contact with the wire. The IDC can be connected to various electrical components to form, for example, a connector. Referring again to FIG. 3, it can be seen that the holder 4 is formed in an aperture 3 formed in half of the CUGRP sheets 5. The wire 2 is displaced from the surface of the CUGRP sheets at the connection point.

Figure 4:
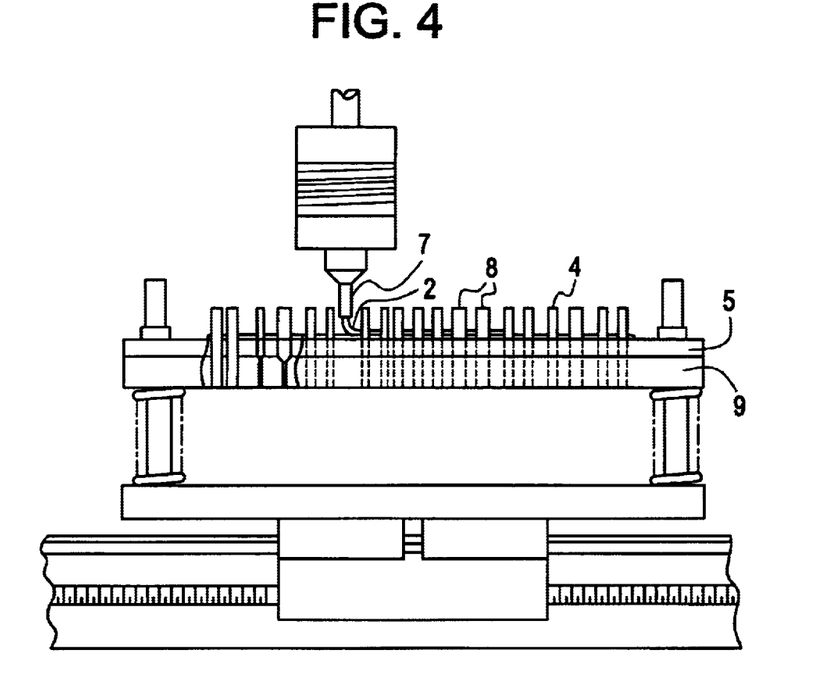
FIG. 4 shows an apparatus for automatically laying wire.

FIG. 4 shows an apparatus which could be used to automatically lay wire in a desired configuration-on layers of thermoplastic material. Using this apparatus the thermoplastic sheets 5 are first secured on a frame 9. Wire holders 4 are then placed on the sheets 5 at predetermined locations. Wire 2 is dispensed from a wire feed nozzle 7 and the frame is moved beneath the stationary nozzle so that the wire is laid in the desired configuration. At the connection points the wire 2 is routed through the wire holders 4. Alternatively the wire could be laid by a moving robotic arm whilst the frame remains stationary. In either case in order to lay a new wire configuration all that needs to be changed is the software controlling the movement of the frame or robotic arm.

After the wire has been laid, further CUGRP sheets are laid in the frame, covering the wire but leaving the connection points exposed. The whole assembly is then heated in an oven and finally formed in a press. Alternatively the first substrate sheet and wires 2 may be foam covered, the foam forming the second sheet. After this the trim panel is finished off by trimming the excess material and covering in fabric. Once the trim panel is completed the IDC terminals can be inserted into the wire holders.

Figure 6:
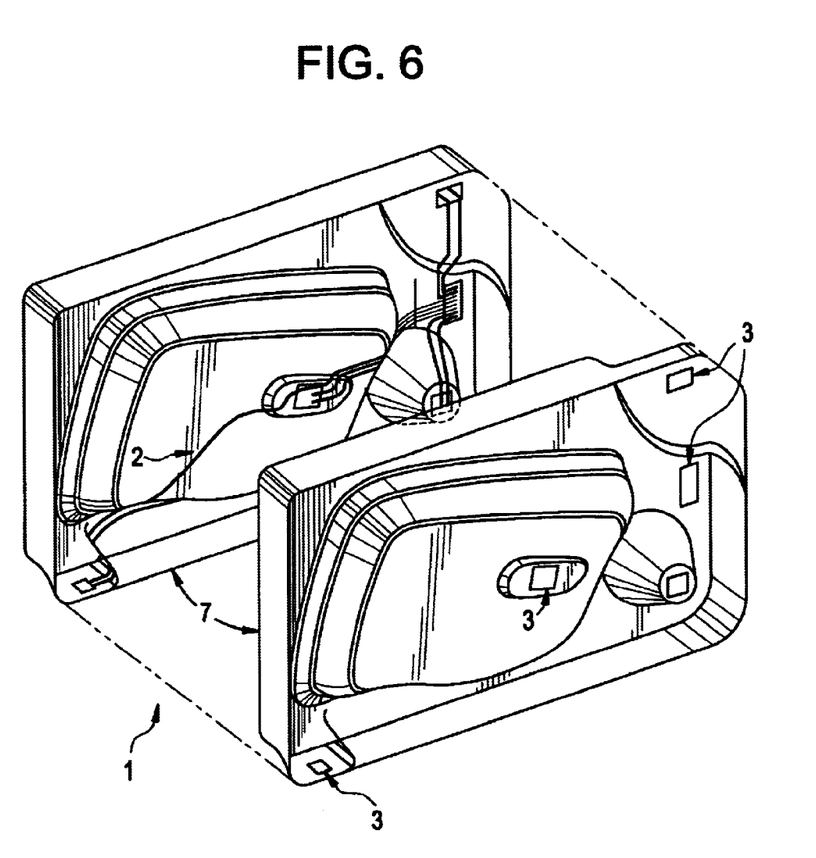
FIG. 6 is an exploded view of an assembled panel.

FIG. 6 shows an exploded view of an assembled vehicle trim panel 1. The panel 1 is shown in two pieces but, as discussed above, is manufactured in one piece. The CUGRP sheets are laminated and pressed into a shape suitable for insertion into a particular place in a vehicle. The non-insulated wires 2 embedded in the CUGRP sheets are pressed with the sheets. Apertures 3 are shown which provide access to the wires 2 at connection points. Connectors such as IDCs 6 are attached to the wires through the apertures 3.

Figure 7:
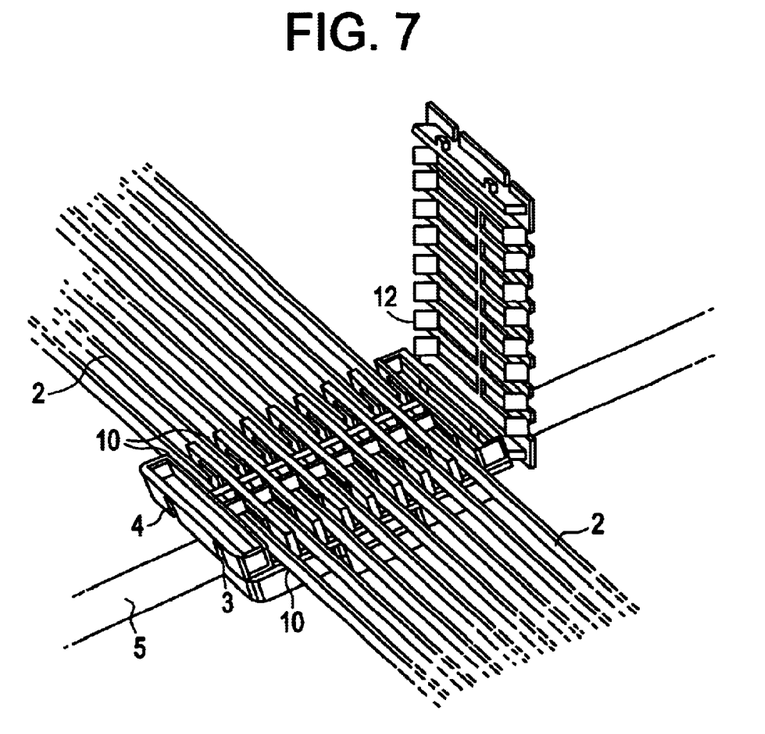
FIG. 7 shows a wire holder with wires inserted.
Figure 8:
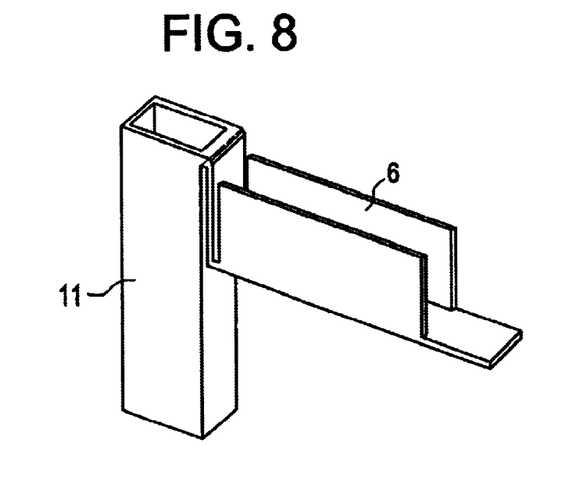
FIG. 8 shows the IDC terminal configurations.
Figure 9:
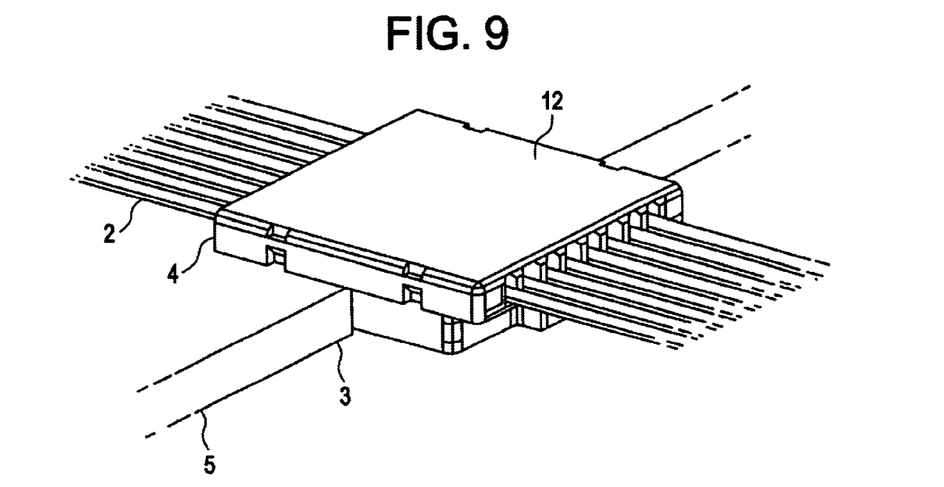
FIG. 9 shows a back housing with lid shut.
Figure 10:
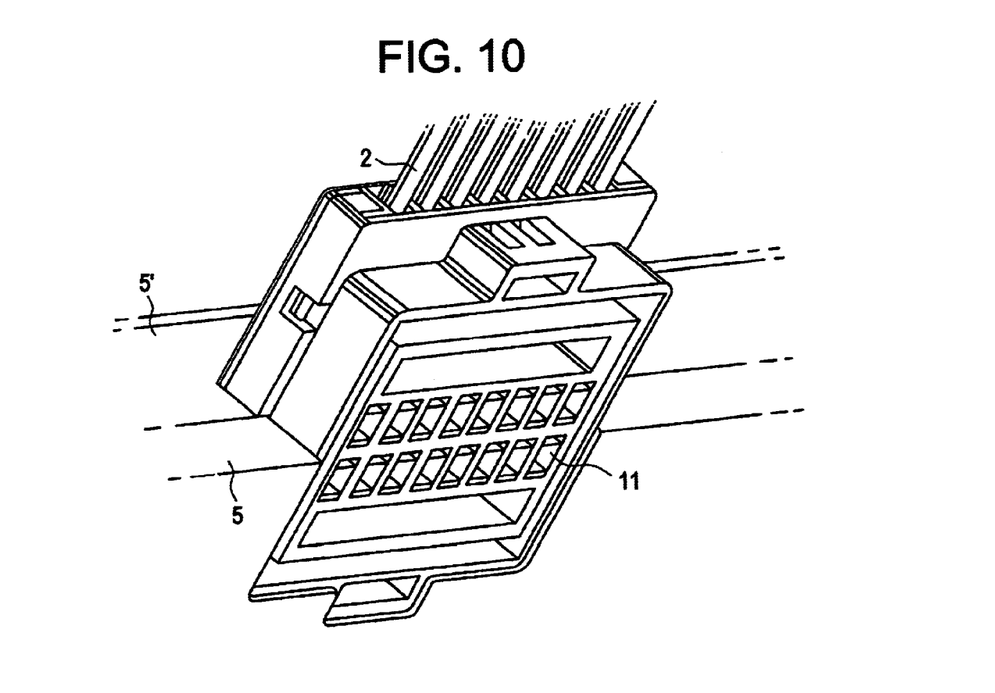
FIG. 10 shows the under view of the back housing of FIG. 9 when embedded.

FIG. 7 shows a further example of the invention during manufacture, in which a first substrate sheet 5 has an aperture 3 (for example, made by a water cutter) into which is placed a holder 4. The holder is secured into the aperture by means of an interferance fit between holder and aperture. The holder 4 has a series of slots 10 into which IDC components 6 are inserted such that, in use, an IDC terminal 6 is secured into the holder by means of a lance, as on existing terminals 8. Wires 2 can be inserted into the IDC 6 to make electrical contact therewith. The IDC terminals 6 are placed into the holder 4 prior to the holder 4 being placed into the aperture. The IDC's 6 are shown in more detail in FIG. 9, in which it can be seen that they have a connector component 11 formed therewith. The connector component 11 is perpendicular to the direction of the slot 10. In this example, therefore, the holder 4 also acts as a connection terminal. Once wires 2 have been inserted, either manually or automatically (additional adhesive could be used to ensure the seal of the connector), a holder housing lid 12 is placed over the wires 2 and slots 10 to seal them (additional adhesive could be used to ensure the seal of the connector) and to retain the wires 2. The housing lid 12 may be pivotally attached to the base of the holder 4 for ease of operation. The closed holder is shown in FIG. 8. A second sheet 5' is then formed over the wire holder 4 and the wires 2 as well as over the first sheet 5. This provides an encased panel of the type described above. In this example the second sheet 5' is formed from foam, and it is therefore particularly beneficial to have the holder lid 12, as this seals the IDC 6, wires 2 and electrical connector 11 (possibly in conjunction with an additional adhesive bead) to prevent foam ingress. The foam itself acts to secure the connector. Further treatment may then be performed on the panel in order to provide the necessary finish as required.

Figure 11:
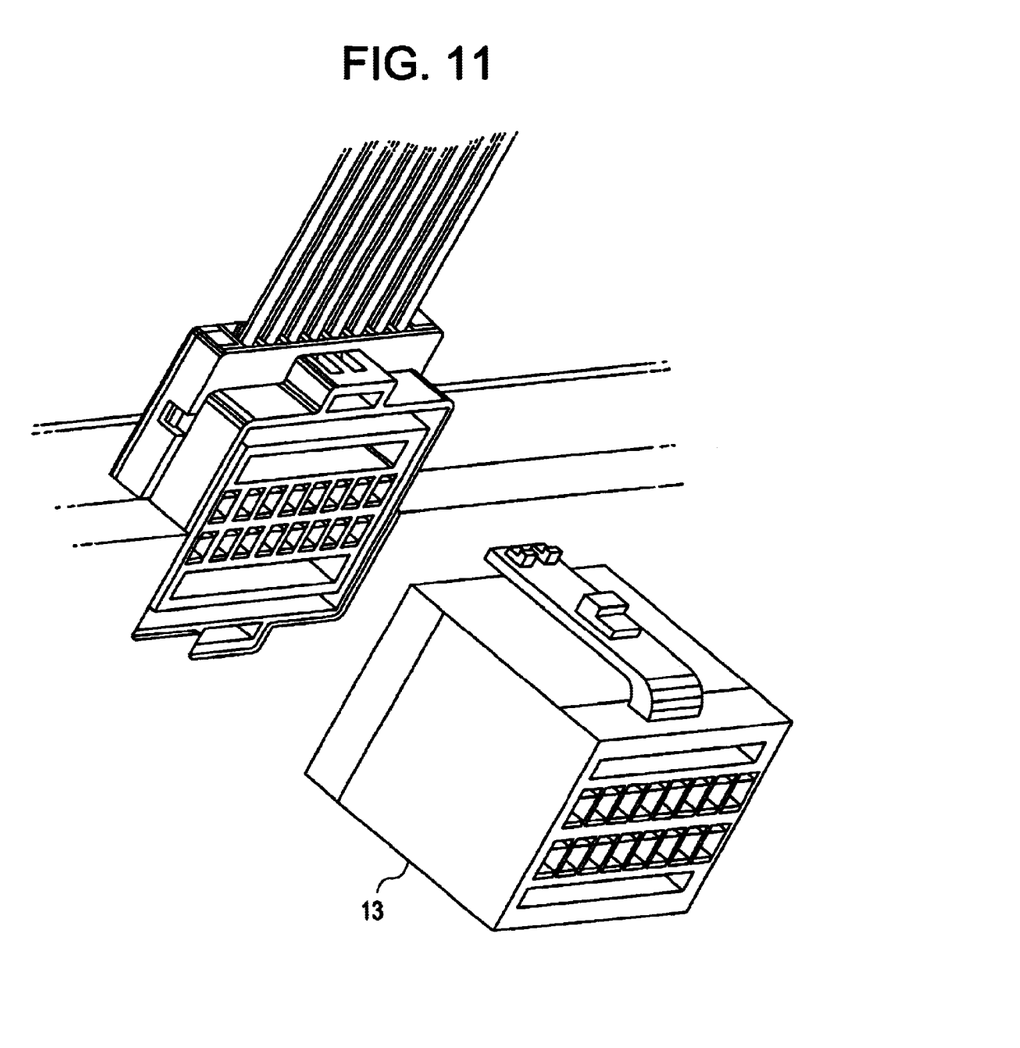
FIG. 11 shows an exploded view of an embedded back housing and front housing.

As can be seen from FIG. 11, the holder 4 provides, with the electrical connectors 11, a socket into which a standard terminal block 30 can be inserted. The base of the holder 4 is flush with the surface of the sheet 5. In both examples this not only reduces the overall thickness of the panel, but has benefits in terms of tooling. With this configuration, if a repositioning of the holder 4 is required then this can be performed simply and effectively by simple software adaptation of the cutting of the aperture 3 into which the holder 4 is retained. If the holder 4 were not flushe or recessed then the protrusion would have to be taken into consideration when tooling the production apparatus for preforming of the sheet 5 and the panel as a whole. Any movement of the position of the wire holder 4 would then result in complete retooling, increasing costs and production time.

It should also be noted that the arrangement of the present invention, as shown in FIGS. 7 to 11, enables a large number of wires 2 to be connected to the holder 4 and hence to terminal block 13, as two rows of electrical terminals 11 can be aligned in close proximity to one another whilst not increasing the overall thickness of the panel 1.

What is claimed is:

1. A vehicle panel comprising:
    at least one electrically conductive wire;
    a thermoplastic or thermoset sheet encasing and insulating the conductive wire; and,
    apertures in the sheet containing holders to retain the wire and to allow the wire to be connected to external electrical components, wherein the wire holders are substantially flush or recessed with the surface of the panel.

2. A vehicle panel according to claim 1, wherein the wire is non-insulated wire.

3. A vehicle panel according to claim 1 or 2, wherein the panel is a vehicle trim panel.

4. A vehicle panel according to claim 1 or 2, wherein the thermoplastic or thermoset sheet is injection moulded, stamped or formed material, reinforced, filled or unfilled.

5. A vehicle panel according to claim 1 or 2, wherein the vehicle panel includes a plurality of wires all of which are insulated from one another by the sheet.

6. A vehicle panel according to claim 1 or 2, wherein the thermoplastic sheet or thermoset is made from Continuous Unidirectional Glass Reinforced Polypropylene (CUGRP) or Glass Reinforced Polyurethane.

7. A vehicle panel according to claim 1 or 2, wherein the wire holders are adapted to be compatible with insulation displacement connectors (IDCs).

8. A vehicle panel according to claim 1 or 2, wherein the wire holders are formed to provide electrical connection to a terminal block in use.

9. A method of producing a vehicle panel comprising the steps of:

laying wire on a first sheet of thermoplastic or thermoset composite material in a desired configuration;

placing or forming a second sheet of thermoplastic or thermoset material on the first sheet of material thereby sandwiching the wire; and pressing the sheets together so that they encase and insulate the wire, wherein the wire is left exposed at connection points formed by apertures in the sheets;

wherein the wire is secured by wire holders at positions corresponding to the connection points prior to pressing or forming the second sheet of thermoplastic material, and wherein the wire holders are arranged to be flush or recessed with respect to one surface of the panel when it is formed.

10. A method of producing a vehicle panel according to claim 9, further comprising the step of heating the sheets above their softening point prior to pressing them together.

11. A method of producing a vehicle panel according to claim 9 or 10, wherein the first or second sheet is laminate.

12. A method of producing a vehicle panel according to claim 9 or 10, wherein the wire is laid manually.

* * * * *